No. 635,477.  
G. J. GUNDERSON.  
FRICTION CLUTCH.  
(Application filed June 22, 1899.)  
(No Model.)
Patented Oct. 24, 1899.
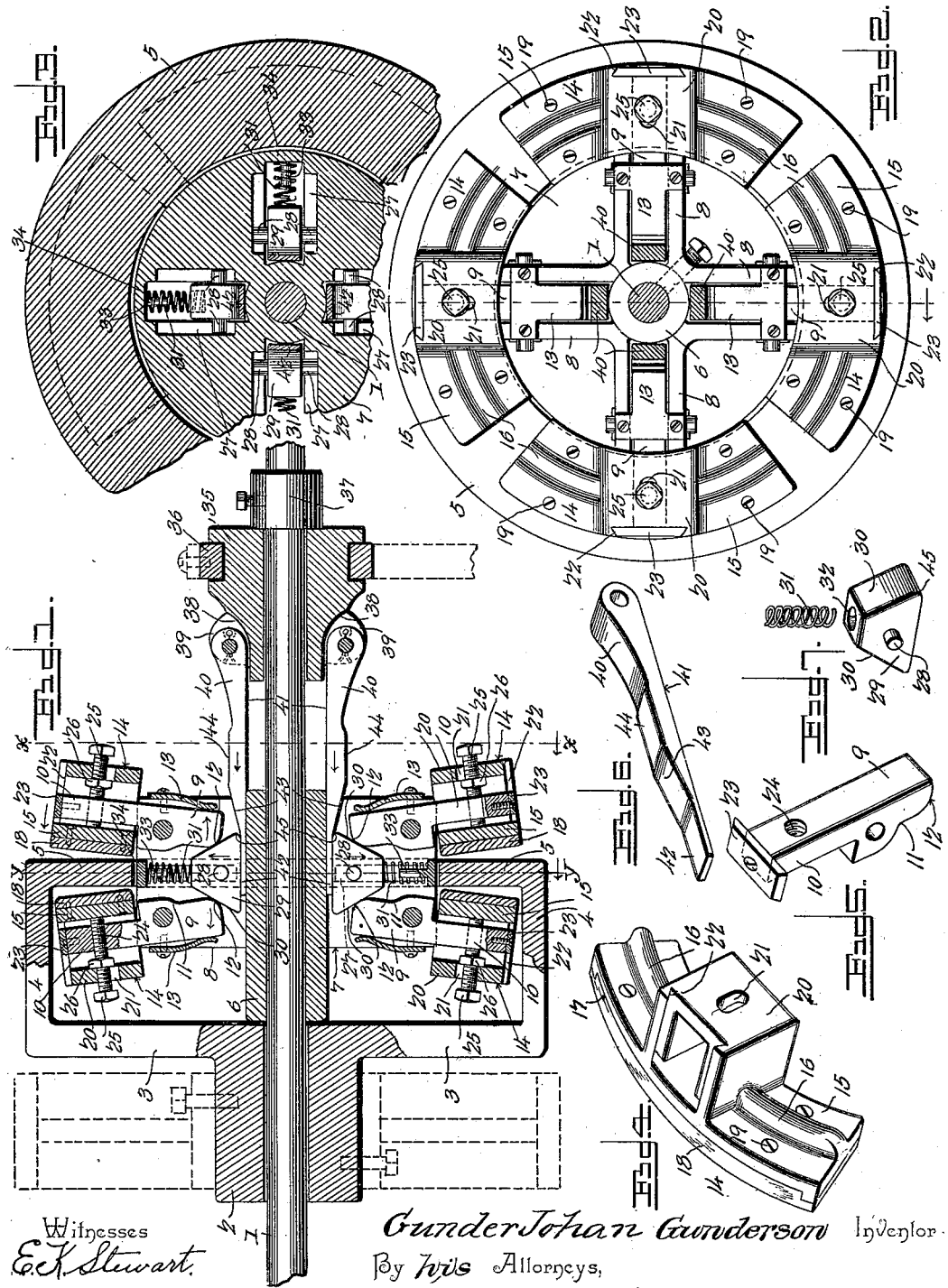

UNITED STATES PATENT OFFICE.

GUNDER JOHAN GUNDERSON, OF CHICAGO, ILLINOIS.

FRICTION-CLUTCH.

SPECIFICATION forming part of Letters Patent No. 635,477, dated October 24, 1899.

Application filed June 22, 1899. Serial No. 721,498. (No model.)

*To all whom it may concern:*

Be it known that I, GUNDER JOHAN GUNDERSON, a citizen of the United States, residing at Chicago, in the county of Cook and State of Illinois, have invented a new and useful Friction-Clutch, of which the following is a specification.

This invention relates to friction-clutches, and particularly to devices of this character having a clutch-ring on one member to receive the frictional or gripping pressure of pairs of heads on an adjacent member.

The purpose of the present form of clutch is to overcome numerous disadvantages heretofore existing in analogous structures by instituting a positive response of the movable gripping device and avoid wear by having a self-adjustable disposition of their contacting faces and also to impart to the active mechanism an equality and regularity of translated pressure which can be increased or diminished in accordance with the requirements and demands of the coöperating parts and without apparent end thrust on journal-boxes and collars or other injurious strains.

The invention primarily consists of a clutch-ring connected to or forming a part of a pulley or other momentum-imparting devices loosely mounted on a shaft adjacent gripping-arms provided with heads supported in keyed relation to the said shaft and secondarily operated by a sliding wedge initially actuated by a longitudinally-shiftable finger having a working surface and a seat.

The invention further consists of the details of construction and arrangement, as well as subcombinations, which will be more fully hereinafter described and claimed.

In the accompanying drawings, Figure 1 is a longitudinal vertical section of a clutch embodying the invention. Fig. 2 is a section on the line *x x*, Fig. 1, looking in the direction of the arrows. Fig. 3 is a section of the device, taken in the direction of the arrow on line *y y*, Fig. 1. Fig. 4 is a detail perspective view of one of the gripping-heads. Fig. 5 is a similar view of one of the gripping-arms. Fig. 6 is a similar view of one of the actuating-fingers. Fig. 7 is a similar view of one of the wedges and its spring.

Similar numerals of reference are employed to indicate corresponding parts in the several views.

The clutch, as shown in the accompanying drawings, is arranged to couple a driving-shaft and pulley or other power-imparting device loosely mounted thereon and to impart the movement of the said shaft to the pulley or other device. It will be understood, however, that the parts could be reversely arranged or the clutch be arranged in connection with a driving-shaft and an adjacent driven shaft and that gearing could be substituted for the pulley without departing from the invention.

In the arrangement shown the numeral 1 designates a driving-shaft on which is loosely mounted a hub 2, having radial arms 3, provided with outer angular supports 4, connected to or forming a part of a clutch-ring 5, which stands in concentric relation to the said shaft. Keyed to the said shaft 1 is a hub 6 of a spider 7, having arms 8, which are arranged in parallel pairs and provide the opposite side walls for the operative disposition of parts which will be presently set forth. The spider 7 has its central portion in a vertical direction constantly in alinement with the inner termination of the ring 5, and between each pair of arms 8 clutch-arms 9 are pivoted in reverse relation and have outer reduced ends 10 projecting beyond the terminations thereof. The clutch-arms 9 adjacent and inward from their pivotal points have regular contacting edges 11 and the inmost corners rounded off, as at 12. These clutch-arms are normally held thrown in at their inner ends by flat or analogous springs 13, bearing thereupon, and consequently the outer reduced ends of said arms stand in divergent planes. The springs 13 are strong enough to constantly maintain this normal position of the clutch-arms, and the adjusting mechanism which is employed to change the angle of the said arms in the spider will operate against the tension of the said springs, and when said mechanism is out of forceful engagement with said arms the latter will automatically resume the position shown. On the outer end of each arm a gripping-head 14 is adjustably mounted and, as clearly shown by Fig. 4, comprises a segmental plate or body 15, having an outer strengthening-rib 16 and a seat 17 on its inner face to receive a wooden or other contacting shoe 18, which is held by screws or analogous fastenings 19. At the center of the segmental plate or body 15 a box 20 is located, and in the outer vertical wall of the same an elongated slot 21 is formed. The upper opposite portion of the box 20 is recessed to provide a dovetail seat 22, which opens out through the vertical wall of the said box. On the reduced end 10 of the arm 9 a dovetail plate 23 is secured and is adjustably mounted in the dovetail seat 22 and serves to maintain a steady assemblage of the segmental head and the arm and whereby wabbling or irregular movement of the head is prevented. The arm 9 within the reduced end 10 has a screw-threaded opening 24 extending therethrough, which alines with the slot 21 when the arms and heads are connected, and movably extending through the said slot 21 and screw-threaded opening 24 of the respective parts is an adjusting-screw 25, having an outer polygonal head and a jam-nut 26. The reduced outer end of the arm 9 permits the head, and particularly the box 20, to have free adjustment thereon, and the central outer portion of the head, providing an inner wall for the said box, is always parallel with the contiguous edge of the outer reduced end of the arm. The plate 23 preserves this parallelism just referred to, and the angle of position of the arm 9 is primarily such that the shoe 18 will be brought squarely against the face of the ring 5 and with which it always stands in operative relation. By manipulating the screw 25 the box 20 and its head can be shifted in or out on the outer reduced end 10 of the arm 9, and thus provide for an increase or decrease of the pressure of the shoe against the clutch-ring and also to compensate for wear. When this adjustment is made, the plate 23 slides in the dovetail seat 22 in either direction or corresponding to the movement of the said box.

The inner opposite central portions of each pair of arms 8 of the spider have alined guide-recesses 27 formed therein, as more clearly shown in Fig. 3, and movably receive the opposite guide-studs 28 of a sliding wedge 29. This wedge is preferably of truncated triangular form and presents opposite equally-inclined edges 30 to the inner rounded corners 12 of the arms 9, which constantly bear thereon. This wedge is normally shoved inwardly toward the center of the spider and centrally of the arms between which it moves by a spring 31, having its inner end extending into a socket 32 in the outer truncated portion thereof and its opposite or outer end fitted over an inwardly-projecting pin 33, supported by a cross-web 34, connecting the central portions of the outer terminations of the arms 8 in a transverse direction. This web 34 is preferably integral with the arms, and the spring is strong enough to force the wedge 29 inward.

Slidingly mounted on the shaft 1 at a suitable distance from the spider 7 is a clutch-operating sleeve 35, which receives a split ring or other analogous device 36, connected to a shifting lever. The clutch-sleeve 35 is limited in one direction by a clutch-collar 37, which is made fast to the shaft 1, and at the inner end of said sleeve regular bearing-seats 38 are provided and comprise adjacently-situated ears, having the outer end of the finger 40 removably secured therein. The inner edge 41 of the said finger is flat or straight and movable over the hub 6 of the spider 7, the said hub by this means forming a regular guide for the movement of the finger. The finger, as shown in detail in Fig. 6, is formed with an inner reduced rest 42, upon which the inner extended edge of the wedge 29 normally has bearing when the clutch members or parts are disengaged. Immediately succeeding the rest 42 is a bevel or inclined working face 43, which merges or continues into a seat 44. The opposite corners of the wedge 29 are also rounded, as at 45, so as to permit an easy riding motion of the wedge over the different parts of the finger, particularly in one direction, as will be understood.

When it is desired to change the position of the clutch-heads from that shown in Fig. 1 and to engage the spider with the clutch-ring 5 to transmit therethrough the motion of the shaft 1 to the pulley or other device that may be connected to the hub 6, the clutch-sleeve 35 is moved toward the left, thus forcing the wedge 29 outwardly by means of the working face 43 of the finger 40, which is simultaneously shifted with the said clutch-sleeve. The opposite equally-inclined edges 30 of the wedge move with equal expanding pressure over the inner round corners of the arms 9 and force the inner ends of the latter outwardly in the direction of the arrows and the heads, carried by the outer reduced portions of the said arms, inwardly. This operation continues until the seat 44 of the finger 40 is fully against the inner edge of the wedge 29, and when said seat shall have arrived in this position the shoes 18 of the head 14 will be in firm contact with the clutch-ring 5, and this position can be maintained as long as desired without danger of accidental release that might arise from vibrations or otherwise, and particularly in view of the firm engagement of the seat 44 with the inner extended edge of the wedge 29. When it is desired to release the clutch-heads from the clutch-ring, the clutch-sleeve 35 is shifted in the opposite direction, thus permitting the wedge 29 to be thrown inwardly toward the center and the said heads moved outwardly, so as to clear the shoes 18 from contact with the opposite faces of the clutch-ring 5 by means of the springs 13 exerting their tension against the inner portions of the arms 9. It will be observed that the wedge 29 is never disengaged from the inner portions of the arms 9 or the finger 40, and the several parts are thus always ready for quick action.

The number of the arms 9 and heads 14, as well as wedges 29 and fingers 40, may be increased or decreased at will and proportioned in accordance with the dimension of the clutch-ring or other devices that might be substituted and which are well known in the art. The construction is the same in each instance, and in describing these specific features, as well as the operation, only one pair of heads and arms and a single wedge and finger have been included, because the said arrangement would be operative and at least is all the reference necessary to illustrate the invention in view of the duplication of similar parts at all points.

When a plurality of the fingers 40 and wedges 29 are used together with the complementary arms 9 and heads 14, the movement will be equally carried on throughout the several similar mechanisms, as the said fingers are similar in every part, and the contacting pressure of the heads at various points on the clutch-ring 5 will positively rotate the latter and such other devices as may be influenced thereby without lost motion or slip.

Changes in the proportions, size, and minor details of construction may be resorted to other than those enumerated without departing from the spirit or sacrificing any of the advantages of the invention.

Having thus described the invention, what is claimed as new is—

1. A clutch comprising a clutch-ring having an inwardly-extending portion, a pair of heads disposed on opposite sides of the inwardly-extending portion of the said ring and having inwardly-extending clutch-arms, a radially-movable wedge disposed between the said arms and operable to draw the heads of the same together, a slidable finger disposed in a plane at right angles to said wedge and bearing against the latter, and means for supporting the said devices.

2. A clutch comprising a clutch-ring, a pair of movable arms adjacent the ring and normally held diverged, heads adjustably carried by the said arms, a wedge between the arms provided with opposite oblique edges engaging the latter at a distance inward from their pivotal points, a slidable finger for operating the said wedge, and means for supporting the said devices.

3. A clutch comprising a clutch-ring normally loose on a bearing, a pair of arms pivotally mounted adjacent the clutch-ring and rotatably movable with a driving device, the inner ends of said arms being normally converged toward each other, heads adjustably mounted on the outer ends of the said arms on opposite sides of the clutch-ring and having shoes to bear against the latter, a radially-movable wedge having opposite inclined faces bearing against the converged inner ends of the arms and located between the latter, and a finger for operating the said wedge disposed in a plane at right angles to the inner edge of the wedge and provided with a working face and a seat.

4. A clutch comprising a clutch member adapted to be driven, inwardly-extending movable arms carrying heads in fixed rotatable relation to a driving member, a radially-slidable wedge mounted between parts of the said arms and also rotatable with the driving member, and a slidable finger having a rest with which the wedge is in continual loose engagement and also provided with an inclined working face and a flat seat.

5. A clutch comprising a clutch-ring adapted to be driven, a spider fast to a driving-shaft, a pair of arms pivotally mounted in the said spider and having their inner ends converged, heads adjustably mounted on the outer ends of the said arms, springs for holding the arms inward at their inner portions, a spring-actuated wedge radially slidable between the inner edges of the arms, and a slidable finger having bearing against the inner edge of the wedge and shiftable to change the position of the latter.

6. A clutch comprising a clutch-ring loose on a support, a spider fast on a driving-shaft, a pair of arms pivotally mounted in the said spider having outer reduced ends the said arms being normally divergent toward their outer ends, dovetail plates on the outer ends of the arms, heads having boxes with dovetail seats in the upper portion thereof to receive the plates, adjusting-screws movably fitted in the said boxes and arms, shoes on the inner faces of the heads, and means for operating the said heads and arms to bring the shoes thereof against the clutch-ring.

In testimony that I claim the foregoing as my own I have hereto affixed my signature in the presence of two witnesses.

GUNDER JOHAN GUNDERSON.

Witnesses:
O. ANDRESON,
EUGENE COOK, Jr.